United States Patent [19]

Karaali

[11] Patent Number: 5,164,965

[45] Date of Patent: Nov. 17, 1992

[54] METHOD AND APPARATUS FOR SYNCHRONIZING A RECEIVER TO A RECEIVED SIGNAL

[75] Inventor: Orhan Karaali, Schaumburg, Ill.

[73] Assignee: Motorola, Inc., Schaumburg, Ill.

[21] Appl. No.: 688,417

[22] Filed: Apr. 22, 1991

[51] Int. Cl.⁵ .............................................. H04L 7/00
[52] U.S. Cl. ...................................... 375/106; 375/110
[58] Field of Search ............... 375/106, 108, 110, 111, 375/118, 119, 120; 370/100.1, 101, 105.5

[56] References Cited

U.S. PATENT DOCUMENTS

| | | | |
|---|---|---|---|
| 4,338,579 | 7/1982 | Rhodes | 375/110 |
| 4,608,702 | 8/1986 | Hirzel et al. | 375/110 |
| 4,796,280 | 1/1989 | Nesin et al. | 375/110 |
| 4,933,959 | 6/1990 | Knechtel | 375/120 |

Primary Examiner—Stephen Chin
Attorney, Agent, or Firm—Philip P. Macnak; William E. Koch; Thomas G. Berry

[57] ABSTRACT

A receiver (100) capable of synchronizing to a received signal (302) samples the received signals (302) at a plurality of sample points, and stores all occurrences of zero-crossings corresponding to the plurality of sample points. A processor (212) synchronizes the receiver (100) to the received signal (302) in response to the number of zero-crossings.

20 Claims, 5 Drawing Sheets

METHOD AND APPARATUS FOR SYNCHRONIZING A RECEIVER TO A RECEIVED SIGNAL

FIELD OF THE INVENTION

This invention relates in general to synchronization and more specifically, to a method and apparatus for synchronizing a receiver to a received signal.

BACKGROUND OF THE INVENTION

Currently, receivers achieve synchronization of received signals such as minimum shift keyed (MSK) signals by using two Phase-Lock-Loops (PLL). For example, a conventional MSK modulation scheme having 1.2 kHz and 1.8 kHz frequencies typically incorporates a PLL at each frequency. Each PLL locks onto the received signal when the frequency matches its operating frequency. After locking, the PLLs continuously produce received information on the 1.2 kHz or 1.8 kHz signals respectively. This information is used to determine the bit boundaries of the incoming signal to enable synchronization of the receiver. In this way, the receiver can be continuously adjusted during the synchronization period to achieve and maintain synchronization.

However, with this PLL method, the end of the transmitted preamble (synchronization) signal may significantly affect the accuracy of the synchronization achieved. That is, by permitting continuous adjustment during the synchronization period, all changes in bit boundaries will cause a synchronization adjustment. Specifically, when the end of the preamble is very noisy, the inaccuracy in the adjustment in synchronization is more likely to substantially affect the synchronization achieved, because the incorrect adjustment occurs at the end of the adjustment period. Additionally, in a noisy signal environment, the wrong PLL may be updated because of the difficulty in determining the transition points between the two frequencies (i.e., when one frequency stops and the other frequency starts). Thus, a loss of synchronization may result. Also, the requirements on the memory and central processing unit (CPU) are extensive for implementing a PLL based synchronization scheme with a digital processor.

Thus, what is needed is a memory and CPU efficient techniques for synchronization that is less susceptible to localized noise, while achieving synchronization.

SUMMARY OF THE INVENTION

Briefly, according to the invention, a receiver capable of synchronizing to a received signal samples the received signal at a plurality of sample points, and stores all occurrences of zero-crossings corresponding to the plurality of sample points. A processor synchronizes the receiver to the received signal in response to the number of zero-crossings.

DESCRIPTION OF A PREFERRED EMBODIMENT

Figure 1:
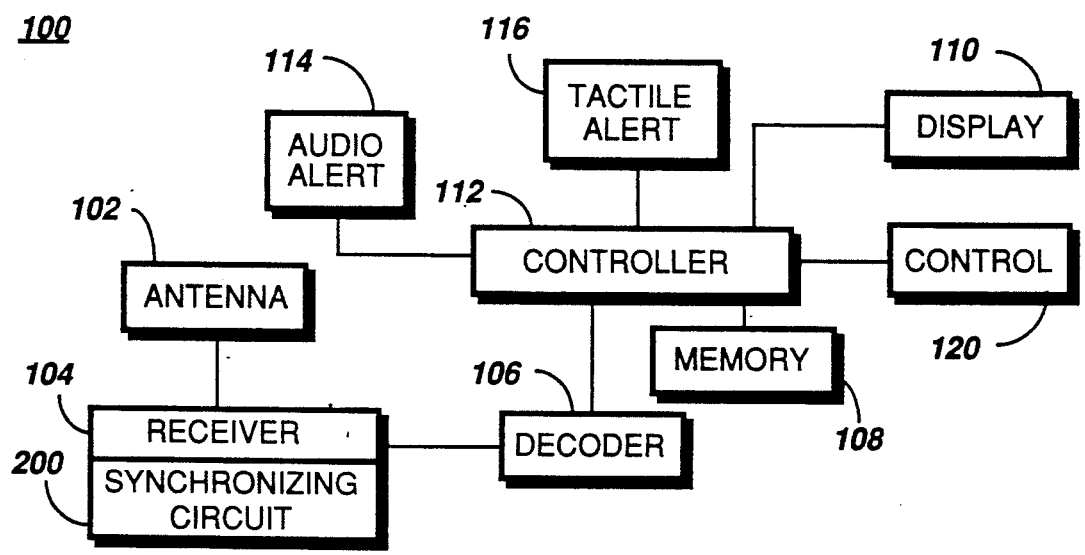
FIG. 1 is a block diagram of a receiver for synchronizing to a received signal in accordance with a preferred embodiment of the present invention.

Referring to FIG. 1, a radio preferably comprises a selective call radio receiver 100 (e.g., a pager) including an antenna 102 that provides a radio frequency (RF) signal that is mixed with a local oscillator signal contained within a receiver module 104. The receiver module 104 includes a synchronization circuit 200 capable of synchronizing the receiver to a received signal. To do this, an oscillator derived signal is generated in a form suitable for processing by a decoder 106 in a manner well known to those skilled in the art. The decoder 106 processes the received signal to decode an address. A controller 112 compares the decoded address with one or more predetermined addresses contained in a memory 108. When the addresses are substantially similar, the user is alerted that a signal has been received either by an audio alert (e.g., a speaker or transducer) 114 or a tactile alert (e.g., a vibrator) 116. The received signal may also include an optional message data directed to one or more selective call receivers. For a message selective call receiver, the recovered message is stored in a memory 108 for subsequent presentation. A display 110 will automatically, or when manually selected by controls 120, presents the message, such as, by displaying the message on the display 110.

Figure 2:
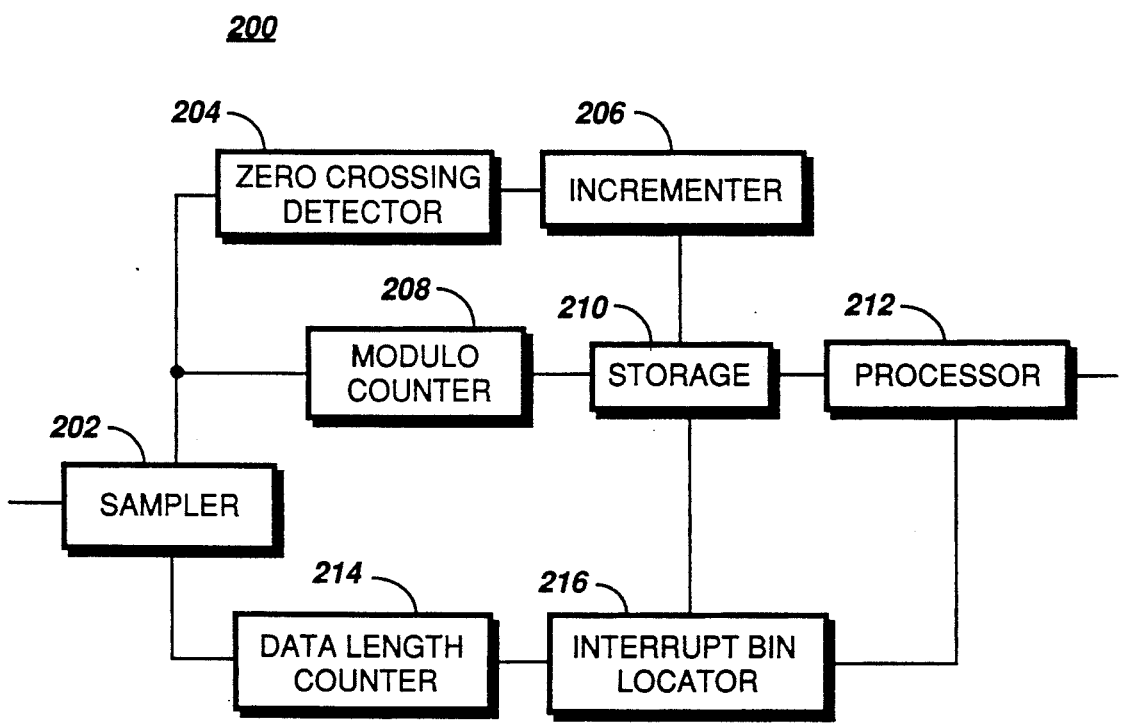
FIG. 2 is a detailed block diagram of the synchronization circuit of FIG. 1.

A more detailed block diagram of the synchronization circuit 200 is shown in FIG. 2 in accordance with the preferred embodiment of the invention. Preferably, the receiver 104 demodulates the recovered signal according to an MSK modulation scheme in a manner well known to those skilled in the art. Those skilled in the art will also appreciate that the demodulated signal will have information at two pre-defined frequencies in an MSK embodiment. In MSK, the frequencies are always chosen so that the frequency changes occur at the zero-crossings and the bit boundaries of the received signals, for example, 1200 Hz and 1800 Hz. A preferred data transmission rate of 1200 bits per second may have a logic "zero" bit preferably encoded as one-period of a 1200 Hz signal and a logic "one" bit preferably encoded as 1.5 periods of a 1800 Hz signal. In this way, a fixed sample length is obtained for sampling both the "zero" and "one" encoded signals.

A sampler 202 preferably comprises an interrupt generator having a preferred sample rate of 12 kHz which is an integer multiple of 1200 Hz for sampling incoming data. Those skilled in the art will appreciate that other integer multiple of data transmission rates (1200 Hz) for sample rates may be chosen. A zero-crossing detector 204 compares a previously received sample with a currently received (new) sample to determine when a zero-crossing occurs between samples. The zero-crossing detection is preferably detected by a sign bit comparison using the conventional method of comparing "twos-complement" received data samples to determine if there is a difference in sign between consecutive samples. Subsequent to each comparison, the previously stored sample is replaced (overwritten in memory) with the present sample and when another new sample is received, the comparison is repeated. In this way, the two latest samples are compared to obtain a zero-crossing determination.

Figure 3:
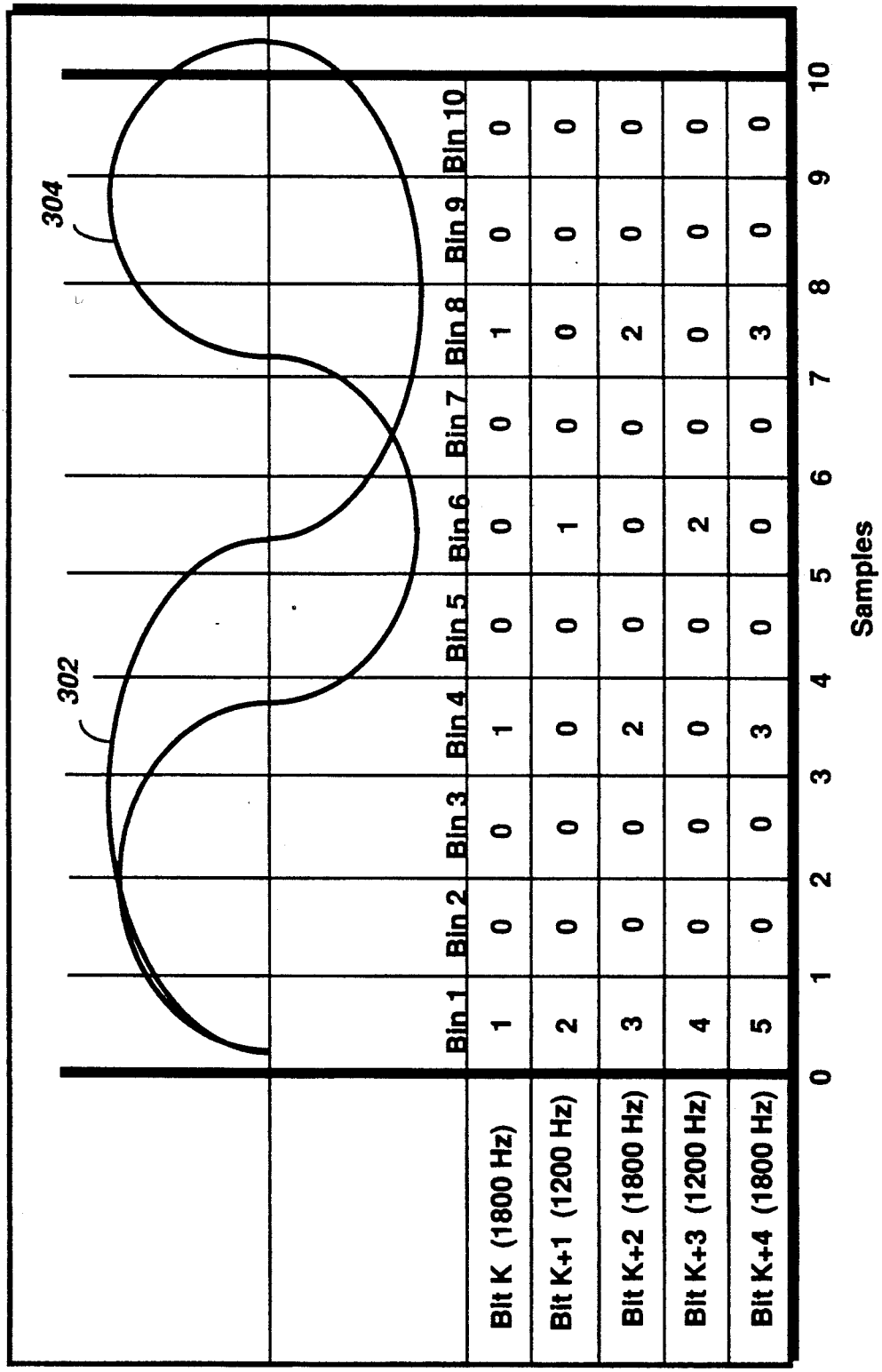
FIG. 3 is a diagram illustrating the time window adjustments with storage locations in accordance with the preferred embodiment of the invention.

When the zero-crossing detector 204 detects a change in sign between samples, an incrementer 206 increments the count of a corresponding storage location in the memory 210. A modulo counter 208 (that also receives the interrupt samples) uses the well known modulo function to point to (address) the storage location to be incremented. For example, FIG. 3 illustrates the present invention's time window adjustment for interrupt bins (storage locations) with an interrupt rate of 12 kHz and a data transmission of 1200 Hz. According to this illustration, ten sample points requiring ten storage locations (e.g., one-per-sample point) are shown only for convenience, since the preferred embodiment with 24 kHz interrupt rate preferably comprises twenty storage locations. As can be seen, signal 302 represents the encoded logic "zero" and signal 304 represents the encoded logic "one". The vertical lines 0–9 are a pictorial time representation of the occurrences of the preferred interrupt points used to sample the received signals 302, 304. This time sample (lines 0–9) is equivalent to an encoded bit time. A modulo function, typically represented as MOD(N), will cycle between the preferred twenty locations, while the modulo counter 208 continuously sequences through the twenty storage locations to point to the appropriate storage location with each received sample point.

A storage means 210 (shown in FIG. 2) stores the count of the detected zero-crossings in the plurality of storage locations (Bin1–Bin10), which maintains the count of all detected zero-crossings. As can be seen, the interrupts occurring at sample 0 and sample 1, as shown, include a zero-crossing therebetween. This is reflected by the number "1" in Bin1 (i.e., storage location 1), and similarly in bin numbers 4 and 8 on line (bit K). Also, on line (bit K+1), the appropriate storage locations are incremented as shown for the occurrences of zero-crossings. In this way, the continuous sampling results in all detected zero-crossings being stored in the appropriate storage locations.

Referring again to FIG. 2, a data length counter 214 counts the input samples and when it reaches a preset value corresponding to the end of the number of bits to be sampled, the synchronization is determined after the zero-crossings detection phase is terminated. This preset value is commonly referred to as the number of preamble bits, and in this illustration, it is chosen to be one-hundred-and-twenty-eight bits. Subsequent to the end of the preamble, an interrupt bin locator 216 locates the bin or storage location containing the maximum number of counted zero-crossings. This storage location (Bin1), in the example to FIG. 3, corresponds to the preferred synchronization point (bit boundary) of the received signal. In this way, a processor 212 preferably obtains the synchronization of the receiver by subtracting the index of the storage location with the maximum zero-crossings from the total number of storage locations. For example, with ten storage locations, and the maximum zero-crossing detected in Bin7, then the interrupt count is three (i.e., 10−7=3), which is used by the processor 212 to assure that the next time the interrupt count will be equal to N which marks the bit boundary at the location containing the maximum zero-crossings.

Thus, the invention advantageously exploits known characteristics of MSK modulation to effectuate synchronization of a receiver to a received signal. That is, since MSK signals will have coincident zero-crossings for the two frequencies at its bit boundaries, by storing the number of zero-crossings at appropriate intervals, synchronization can be determined by the storage location having the maximum number of stored zero-crossings. Thus, synchronization is achieved by decoding data at the interval between the two adjacent bit boundaries where the maximum zero-crossings was detected. Furthermore, by avoiding the continuous adjustment technique used in prior receivers, the effects of localized noise are substantially reduced in the present invention.

However, because phase jitter and noise are so pervasive, some zero-crossings may be detected incorrectly. It is also possible for the actual bit boundary to coincide with an interrupt time causing two adjacent storage locations to share the zero-crossing increments over time. Thus, in an alternate embodiment, the present invention sums each adjacent storage location to determine the storage location-pair with the maximum number of zero-crossings. In this way, the synchronization point (bit boundary) is more accurately determined in noisy signal conditions. Thus, the invention uses CPU and memory efficiently while accurately determining the synchronization of the receiver to the MSK signals.

Figure 4A:
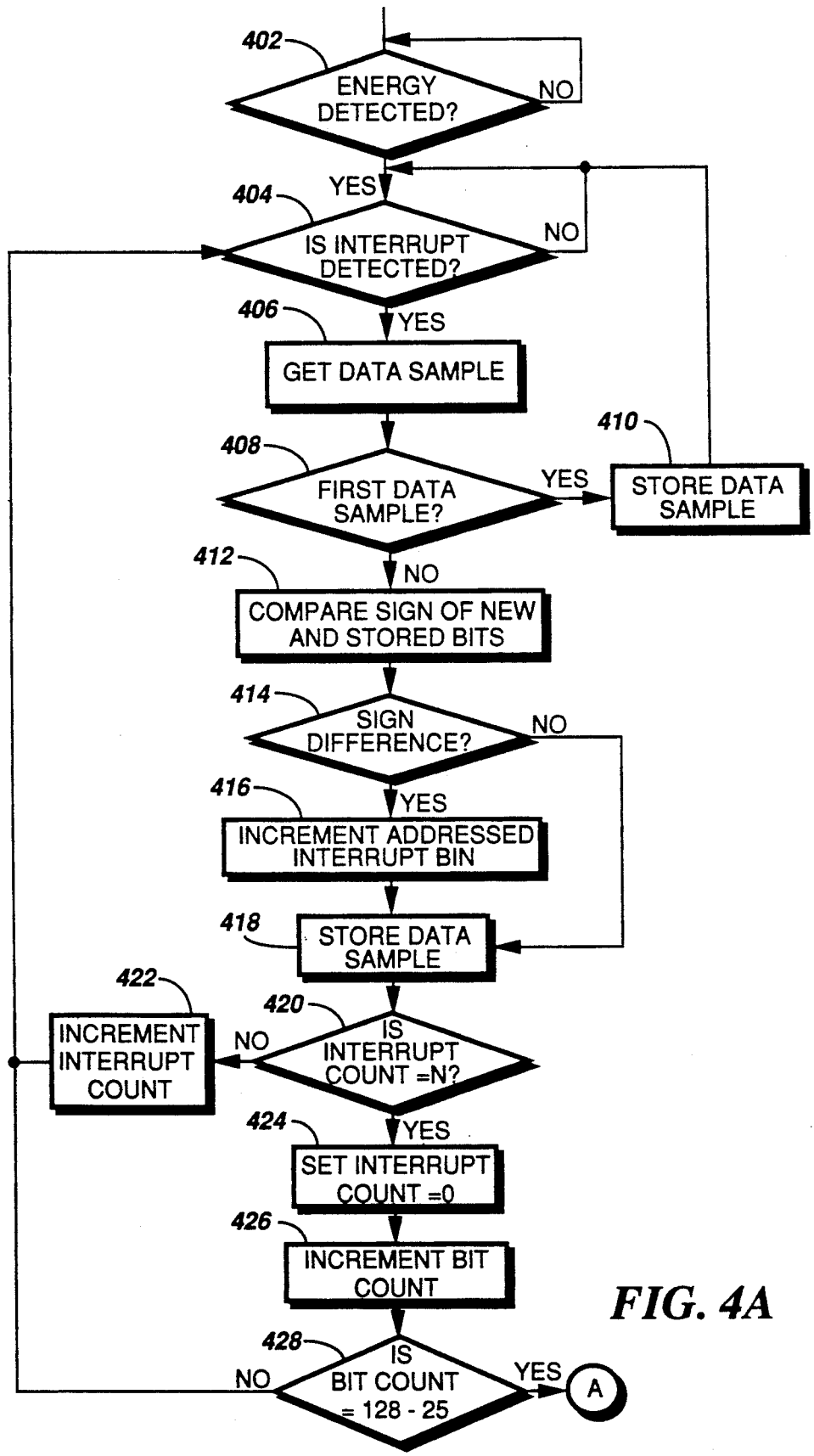
FIGS. 4A and 4B are flow diagrams illustrating the steps executed in accordance with the preferred embodiment of the invention.
Figure 4B:
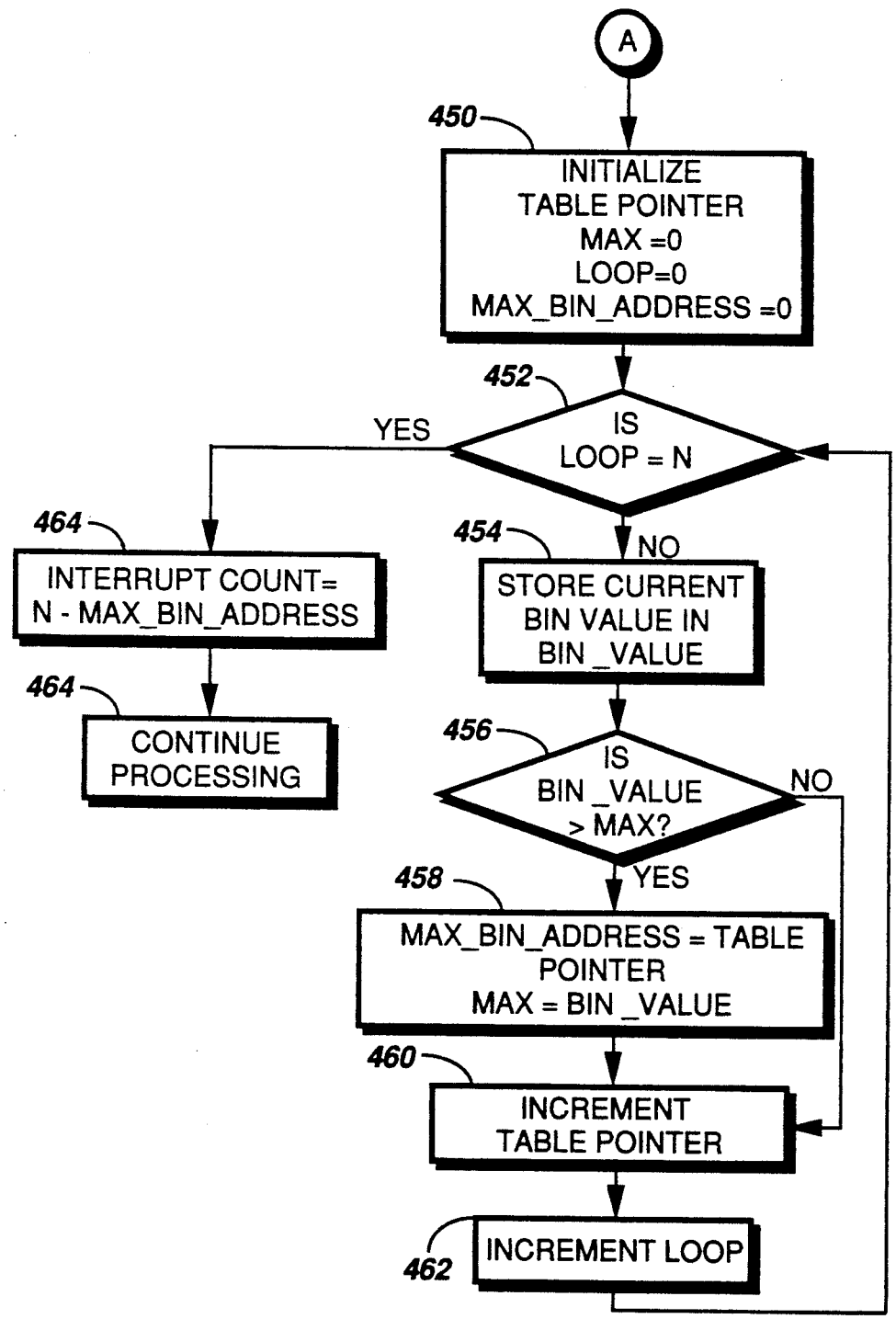

FIGS. 4A and 4B are flow diagrams illustrating the operation in accordance with the preferred embodiment of the invention. Referring to FIG. 4A, all N registers (BINS) are initialized prior to measuring the received energy to determine if a signal is detected (decision 402). When the energy rises above a threshold level, the process waits for an interrupt (decision 404). Step 406 obtains a sample of the data when an interrupt occurs, and decision 408 determines whether this sample is the first data sample obtained. If so, the first sample is stored (step 410), and the process returns to decision 404 to wait for another interrupt. Alternatively, if at decision 408 the received sample was not the first sample, the sign difference between the previously stored sample and the current sample is compared (step 412). At decision 414, if there is a sign difference, the appropriate storage location in incremented (step 416) and the current data sample is stored (step 418). Conversely, if no sign difference, the current data sample is also stored (step 418). In this way, the stored sample is rewritten with each new data sample subsequent to the detection of zero-crossings between the stored sample and a new sample to ensure contiguous zero-crossing detection.

Continuing at decision 420, the interrupt count is examined to determine if its value is N (in the preferred embodiment N=20, the number of samples-per-bit). If it is less than N, the interrupt count is incremented (step 422) and the process waits for the arrival of a next interrupt (decision 404). Alternatively, if the interrupt count is equal to N, this signifies that a complete bit period has been sampled. The interrupt count is then set to zero (step 424) and a "bit count" is incremented (step 426) to count the number of bits sampled. In decision 428, the value of the bit count is subsequently checked to determine if all the preamble bits have been sampled. In this illustration, the number of preamble bits is one-hundred-and-twenty-eight, but the start-up phase takes approximately twenty-five bits, therefore when approximately one-hundred-and-three bits have been sampled, the end of the preamble bits is reached. When this occurs, the synchronization is ready to be determined.

Continuing in FIG. 4B, all values are initialized (step 450). Decision 452 determines whether the number of storage locations (loop) is equal to the number N (e.g. 20). If not, the current value stored in the addressed storage location (bin) is stored in bin_value (step 454).

The value stored in table pointer points to the appropriate storage location (i.e., the storage location being addressed). This value, bin_value, is compared with the value stored in max to determine if bin count is greater than max (decision 456). If yes, the address stored in table pointer is stored in max_bin_address and bin_value is stored in max. In this way, all storage locations are examined and the storage location with the maximum number of zero-crossings is determined by consecutively comparing the current maximum value with the values of the other storage locations.

In step 460, the table pointer in incremented to point to the next storage location. Also, in step 462, loop is incremented and the process returns to determine if loop has reach the value N (step 452). Finally, when the loop reaches the value N, this signifies that all the storage locations have be checked and the storage location with the maximum number of zero-crossings has been determined. In step 464, the interrupt count is initialized to (N minus max_bin_address), where max_bin_address now contains the address (e.g., 1 through 20) of the storage location containing the maximum number of zero-crossings. In step 464, the time window is shifted so that the next interrupt count N will coincide with the storage location where the maximum zero-crossings was determined. Optionally included in step 454, by conventional methods, is the averaging between adjacent storage locations to counter the effects of noise and phase jitter.

In this way, the invention advantageously exploits known characteristics of MSK modulation to reliably effectuate synchronization to the received signals while reducing the memory and processing requirements. In comparison, the invention achieves synchronization at least five times faster (CPU usage), while requiring only a fifth of the program and data memory of the conventional PLL method. Additionally, this method does not require a multiplier, a high precision processor, and a multi-bit analog-to-digital convertor. Changes in the sample rates can be easily achieved to use other sampling rates which are integer multiples of data rate.

I claim:

1. A receiver, comprising:
   means for receiving a signal;
   means for synchronizing, comprising:
   sampling means for sampling the received signal over a predetermined portion of the received signal, said sampling means sampling the predetermined portion of the received signal at a plurality of predetermined intervals;
   zero-crossing-detecting means for detecting zero crossing of the received signal in response to the sampling means;
   storage means, coupled to the zero-crossing-detecting means, for storing information representing an accumulation of the numbers of detected zero-crossings detected at each of the plurality of predetermined intervals; and
   processing means for processing the stored information, said processing means further including a means for determining a predetermined interval of the plurality of predetermined intervals having a maximum number of detected zero-crossings wherein said synchronizing means synchronizes the received signal to the predetermined intervals having the maximum number of detected zero-crossings.

2. The receiver according to claim 1 wherein the sampling means comprises a means for generating an interrupt at a plurality of pre-determined sample points.

3. The receiver according to claim 2 wherein the interrupt generating means generates interrupts over the pre-determined portion of the received signal.

4. The receiver according to claim 1 wherein the synchronization means comprises a means for locating a storage location with a maximum number of zero-crossings.

5. The receiver according to claim 1 wherein the zero-crossing detecting means comprises a means for comparing a current sample with a previous sample.

6. The receiver according to claim 5 wherein the comparing means detects a sign difference between samples.

7. The receiver according to claim 1 further comprising an addressing means having a means for determining a storage location for storing detected zero-crossings corresponding to the predetermined plurality of predetermined intervals.

8. The receiver according to claim 1 further comprising an incrementing means for incrementing the contents of a corresponding storage location when a zero-crossing is determined in one of the plurality of predetermined intervals.

9. A method for synchronizing to a received signal comprising the steps of:
   (a) receiving a signal;
   (b) sampling the received signal at a plurality of predetermined intervals over a predetermined portion of the received signal;
   (c) detecting zero-crossings in response to step (b);
   (d) storing information representing an accumulation of the number of detected zero-crossings at each of the plurality of predetermined intervals;
   (e) processing the stored information by determining a predetermined interval of the plurality of predetermined intervals having a maximum number of detected zero-crossings; and
   (f) synchronizing the received signal to the predetermined interval having the maximum number of detected zero-crossings.

10. The method for synchronizing to a received signal according to claim 9 wherein a frequency of the received signal is used for determining a plurality of sample points over a predetermined portion of the received signal.

11. The method for synchronizing to a received signal according to claim 9 wherein the zero-crossings are determined by comparing a sign of a current sample with a sign of a previous sample.

12. The method for synchronizing to a received signal according to claim 11 wherein the step of detecting the zero-crossings includes a step for determining a sign difference between samples.

13. The method for synchronizing to a received signal according to claim 9 wherein the step of processing the stored information includes the step of incrementing the stored information corresponding to the predetermined interval of the plurality of predetermined intervals in response to the detected zero-crossing.

14. A selective call receiver, comprising:
   means for receiving a signal;
   means for synchronizing, comprising:
   sampling means for sampling the received signal over a predetermined portion of the received signal, said sampling means sampling the predetermined portion of the received signal at a plurality of predetermined intervals;

zero-crossing-detecting means for detecting zero crossings of the received signal in response to the sampling means;

a plurality of storage locations, coupled to the zero-crossing-detecting means, for storing information representing an accumulation of the numbers of detected zero-crossings detected at each of the plurality of predetermined intervals;

addressing means for addressing the plurality of storage locations according to a detected zero-crossing corresponding to the predetermined interval of the plurality of predetermined intervals of the received signal; and processing means for processing the stored information, said processing means further including means for determining a predetermined interval of the plurality of predetermined intervals having a maximum number of detected zero-crossings wherein said synchronizing means synchronizes the received signal to the predetermined interval having the maximum number of detected zero-crossings.

15. The selective call receiver according to claim 14 wherein the sampling means comprises a means for generating an interrupt at a plurality of pre-determined sample points.

16. The selective call receiver according to claim 15 wherein the interrupt generating means generates interrupts over the predetermined portion of the received signal.

17. The receiver according to claim 14 wherein the zero-crossing detecting means comprises a means for comparing a current sample with a previous sample.

18. The receiver according to claim 17 wherein the comparing means detects a sign difference between samples.

19. The receiver according to claim 14 further comprising an incrementing means for incrementing the contents of a corresponding storage location when a zero-crossing is determined in one of the plurality of predetermined intervals.

20. A selective call receiver, comprising:

means for receiving a signal;

means for synchronizing, comprising:

sampling means for sampling the received signal over a predetermined portion of the received signal, said sampling means including means for generating an interrupt at a plurality of predetermined sample points, said interrupt means samples the predetermined portion of the received signal at the plurality of sample points;

zero-crossing-detecting means for detecting zero crossings of the received signal in response to the sampling means, said zero-crossing-detecting means further includes means for comparing a current sample with a previous sample for determining a sign difference between sample points;

a plurality of storage locations, coupled to the zero-crossing-detecting means, for storing information representing an accumulation of the numbers of detected zero-crossings detected at each of the plurality of predetermined intervals;

incrementing means for incrementing the contents of a corresponding storage location when a zero-crossing is determined in one of the plurality of predetermined intervals;

addressing means for addressing the plurality of storage locations according to a detected zero-crossing corresponding to the predetermined interval of the plurality of predetermined intervals of the received signal; and processing means for processing the stored information, said processing means further including means for determining a predetermined interval of the plurality of predetermined intervals having a maximum number of detected zero-crossings wherein said synchronizing means synchronizes the received signal to the predetermined interval having the maximum number of detected zero-crossings.

* * * * *